(12) United States Patent
Marquardt et al.

(10) Patent No.: US 9,749,294 B1
(45) Date of Patent: Aug. 29, 2017

(54) SYSTEM AND METHOD OF ESTABLISHING TRUSTED OPERABILITY BETWEEN NETWORKS IN A NETWORK FUNCTIONS VIRTUALIZATION ENVIRONMENT

(71) Applicant: Sprint Communications Company L.P., Overland Park, KS (US)

(72) Inventors: Ronald R. Marquardt, Woodinville, WA (US); Lyle W. Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 74 days.

(21) Appl. No.: 14/847,992

(22) Filed: Sep. 8, 2015

(51) Int. Cl.
*H04L 29/06* (2006.01)
*H04L 29/08* (2006.01)
*G06F 9/455* (2006.01)

(52) U.S. Cl.
CPC ...... *H04L 63/0272* (2013.01); *H04L 67/1002* (2013.01); *G06F 9/45558* (2013.01); *H04L 67/32* (2013.01)

(58) Field of Classification Search
CPC . H04L 63/0272; H04L 67/1002; H04L 67/32; G06F 9/45558
See application file for complete search history.

(56) References Cited

U.S. PATENT DOCUMENTS

| 5,928,363 A | 7/1999 | Ruvolo |
| 5,983,350 A | 11/1999 | Minear et al. |
| 6,775,772 B1 | 8/2004 | Binding et al. |
| 7,305,712 B2 | 12/2007 | Watt et al. |
| 7,325,083 B2 | 1/2008 | Watt et al. |
| 7,340,573 B2 | 3/2008 | Watt |
| 7,370,210 B2 | 5/2008 | Symes |

(Continued)

FOREIGN PATENT DOCUMENTS

| WO | WO2015039699 A1 | 3/2015 |
| WO | WO2017062101 A1 | 4/2017 |

OTHER PUBLICATIONS

FIAPP Pre-Interview Communication dated Mar. 9, 2017, U.S. Appl. No. 14/930,146, filed Nov. 2, 2015.

(Continued)

*Primary Examiner* — Joseph P Hirl
*Assistant Examiner* — Stephen Gundry

(57) ABSTRACT

A system for establishing a trusted end-to-end communication link between different NFV networks is disclosed. The system comprises a server operating in a trusted security zone and configured to generate and send a trust ticket, a communication request, and disable communication with the first NFV network. The system further comprises a virtual machine executing virtualized network functions and a session border controller. The session border controller is configured to receive the trust ticket, request, and trusted data from the first server; transmit the trust ticket and request to a second session border controller, wherein the trust ticket and request are transmitted to a second server associated with a second NFV network, and receive a response and second trust ticket from the second NFV network, compare the first and second trust ticket for compatibility, and transmit the trusted data if the trust tickets are compatible.

20 Claims, 5 Drawing Sheets

(56) References Cited

U.S. PATENT DOCUMENTS

| | | |
|---|---|---|
| 7,661,104 B2 | 2/2010 | Watt et al. |
| 7,702,951 B2 | 4/2010 | Yamamoto et al. |
| 7,849,296 B2 | 12/2010 | Watt et al. |
| 8,090,797 B2 | 1/2012 | Chinta et al. |
| 8,171,483 B2 | 5/2012 | Nord et al. |
| 8,271,976 B2 | 9/2012 | Vega et al. |
| 8,280,944 B2 | 10/2012 | Laadan et al. |
| 8,443,230 B1 | 5/2013 | James-Roxby et al. |
| 8,712,407 B1 | 4/2014 | Cope et al. |
| 8,797,875 B2 | 8/2014 | Garcia Martin et al. |
| 8,842,578 B1 | 9/2014 | Zisapel et al. |
| 8,935,318 B1 | 1/2015 | Konerding et al. |
| 8,984,110 B1 | 3/2015 | Asveren |
| 8,996,644 B2* | 3/2015 | Pope .................. G06F 13/102 370/419 |
| 9,047,441 B2 | 6/2015 | Xie et al. |
| 9,104,836 B2* | 8/2015 | Burstein .................. G06F 21/00 |
| 9,161,227 B1 | 10/2015 | Bye et al. |
| 9,183,606 B1 | 11/2015 | Paczkowski et al. |
| 9,191,865 B1 | 11/2015 | Paczkowski et al. |
| 9,230,085 B1 | 1/2016 | Paczkowski et al. |
| 9,237,084 B2 | 1/2016 | Chapman |
| 9,282,898 B2 | 3/2016 | McRoberts et al. |
| 9,288,148 B1 | 3/2016 | Krishnaswamy et al. |
| 9,298,515 B2 | 3/2016 | McMurry et al. |
| 9,324,016 B1 | 4/2016 | Cordes et al. |
| 9,384,028 B1* | 7/2016 | Felstaine .................. H04L 67/02 |
| 9,392,446 B1 | 7/2016 | Paczkowski et al. |
| 9,396,016 B1* | 7/2016 | Marquardt .......... G06F 9/45558 |
| 9,407,612 B2* | 8/2016 | Sood .................. H04L 63/06 |
| 9,450,866 B2 | 9/2016 | He et al. |
| 9,460,286 B1* | 10/2016 | Felstaine ............. H04L 63/1441 |
| 9,503,363 B2 | 11/2016 | Pinho et al. |
| 9,509,587 B1* | 11/2016 | Marquardt .............. H04L 45/02 |
| 9,519,563 B2 | 12/2016 | Manghirmalani et al. |
| 9,537,741 B2 | 1/2017 | Chakrabarti et al. |
| 9,549,321 B2* | 1/2017 | Slavov .................. H04W 8/26 |
| 9,565,168 B1 | 2/2017 | Marquardt et al. |
| 9,578,664 B1 | 2/2017 | Paczkowski et al. |
| 9,613,190 B2 | 4/2017 | Ford et al. |
| 9,686,240 B1 | 6/2017 | Ray et al. |
| 2002/0091650 A1 | 7/2002 | Ellis |
| 2002/0107958 A1 | 8/2002 | Faraldo |
| 2003/0177387 A1 | 9/2003 | Osterwalder et al. |
| 2004/0139352 A1 | 7/2004 | Shewchuk et al. |
| 2004/0177269 A1 | 9/2004 | Belnet et al. |
| 2004/0181682 A1 | 9/2004 | Orino et al. |
| 2004/0187117 A1 | 9/2004 | Orion et al. |
| 2004/0240468 A1 | 12/2004 | Chin et al. |
| 2004/0260910 A1 | 12/2004 | Watt et al. |
| 2005/0102603 A1 | 5/2005 | Tapper et al. |
| 2005/0114616 A1 | 5/2005 | Tune et al. |
| 2005/0138421 A1 | 6/2005 | Fedronic et al. |
| 2005/0160210 A1 | 7/2005 | Watt et al. |
| 2005/0185672 A1 | 8/2005 | Endo et al. |
| 2006/0146767 A1 | 7/2006 | Moganti |
| 2006/0190614 A1 | 8/2006 | Altman et al. |
| 2006/0253701 A1 | 11/2006 | Kim et al. |
| 2007/0174253 A1 | 7/2007 | Hodnett et al. |
| 2008/0020745 A1 | 1/2008 | Bae et al. |
| 2008/0162877 A1 | 7/2008 | Altman et al. |
| 2008/0165259 A1 | 7/2008 | Nobels |
| 2008/0301779 A1 | 12/2008 | Garg et al. |
| 2009/0007100 A1 | 1/2009 | Field et al. |
| 2009/0199177 A1 | 8/2009 | Edwards et al. |
| 2009/0241108 A1 | 9/2009 | Edwards et al. |
| 2009/0300605 A1 | 12/2009 | Edwards et al. |
| 2009/0320048 A1 | 12/2009 | Watt et al. |
| 2010/0106568 A1 | 4/2010 | Grimes |
| 2010/0192230 A1 | 7/2010 | Steeves et al. |
| 2011/0119748 A1 | 5/2011 | Edwards et al. |
| 2011/0173443 A1 | 7/2011 | Osterwalder et al. |
| 2012/0040662 A1 | 2/2012 | Rahman et al. |
| 2012/0304244 A1 | 11/2012 | Xie et al. |
| 2012/0331550 A1 | 12/2012 | Raj et al. |
| 2013/0055256 A1 | 2/2013 | Banga et al. |
| 2013/0091568 A1 | 4/2013 | Sharif et al. |
| 2013/0305333 A1 | 11/2013 | Katzer et al. |
| 2013/0333008 A1 | 12/2013 | Tapling et al. |
| 2013/0345530 A1 | 12/2013 | McRoberts et al. |
| 2014/0013327 A1 | 1/2014 | Sherwood et al. |
| 2014/0033316 A1 | 1/2014 | Paczkowski et al. |
| 2014/0047548 A1 | 2/2014 | Bye et al. |
| 2014/0052922 A1 | 2/2014 | Moyer et al. |
| 2014/0053003 A1 | 2/2014 | Moyer et al. |
| 2014/0075567 A1 | 3/2014 | Raleigh et al. |
| 2014/0201374 A1* | 7/2014 | Ashwood-Smith ..... H04L 49/70 709/226 |
| 2014/0241247 A1 | 8/2014 | Kempf et al. |
| 2014/0259115 A1* | 9/2014 | Bakshi .................. H04L 9/3234 726/4 |
| 2014/0281529 A1* | 9/2014 | Epp .................... H04L 63/0428 713/168 |
| 2014/0281544 A1 | 9/2014 | Paczkowski et al. |
| 2014/0298477 A1 | 10/2014 | Castro et al. |
| 2014/0304803 A1 | 10/2014 | Pope et al. |
| 2014/0325681 A1* | 10/2014 | Kleidermacher ... G06F 21/6218 726/29 |
| 2014/0337940 A1* | 11/2014 | Slavov .................... H04W 8/26 726/5 |
| 2014/0344912 A1 | 11/2014 | Chapman et al. |
| 2014/0373012 A1* | 12/2014 | Ylitalo ................. H04W 4/003 718/1 |
| 2015/0046676 A1 | 2/2015 | Archibald et al. |
| 2015/0072726 A1* | 3/2015 | Stern .................... H04W 88/06 455/552.1 |
| 2015/0074745 A1* | 3/2015 | Stern ...................... H04L 63/20 726/1 |
| 2015/0074764 A1* | 3/2015 | Stern .................... H04L 63/06 726/4 |
| 2015/0089246 A1 | 3/2015 | Kanai et al. |
| 2015/0117409 A1 | 4/2015 | Ghai |
| 2015/0117455 A1 | 4/2015 | Umesh et al. |
| 2015/0180730 A1* | 6/2015 | Felstaine ................ H04L 41/022 709/225 |
| 2015/0195281 A1* | 7/2015 | Venkataramu ...... H04L 63/0884 726/3 |
| 2015/0244717 A1* | 8/2015 | Jin ..................... H04L 63/0853 726/4 |
| 2015/0248283 A1* | 9/2015 | Gschwind ............... G06F 8/665 717/172 |
| 2015/0358248 A1* | 12/2015 | Saha .................. H04L 43/0817 709/226 |
| 2015/0365352 A1* | 12/2015 | Xiang .................. H04L 67/10 709/226 |
| 2015/0370704 A1 | 12/2015 | Kato |
| 2015/0373050 A1 | 12/2015 | Dayan et al. |
| 2015/0381423 A1* | 12/2015 | Xiang .................. H04L 41/0893 709/223 |
| 2016/0043944 A1* | 2/2016 | Felstaine .................. H04L 43/12 370/389 |
| 2016/0057102 A1* | 2/2016 | Wei ...................... H04L 61/2007 709/226 |
| 2016/0057788 A1 | 2/2016 | Sharma et al. |
| 2016/0073283 A1 | 3/2016 | Grayson et al. |
| 2016/0080323 A1* | 3/2016 | MacKay ................. G06F 21/57 726/13 |
| 2016/0094573 A1* | 3/2016 | Sood ................... H04L 63/1433 713/156 |
| 2016/0127333 A1* | 5/2016 | Sood ...................... H04L 63/06 380/44 |
| 2016/0142396 A1* | 5/2016 | McRoberts .......... A61B 5/0022 726/7 |
| 2016/0149921 A1* | 5/2016 | Potlapally ............... G06F 21/85 726/7 |
| 2016/0157084 A1 | 6/2016 | Tsubouchi |
| 2016/0170848 A1* | 6/2016 | Yang .................. G06F 11/2023 714/4.12 |
| 2016/0180089 A1* | 6/2016 | Dalcher ................ G06F 21/566 726/23 |
| 2016/0182567 A1* | 6/2016 | Sood ...................... H04L 63/20 726/1 |

(56) References Cited

U.S. PATENT DOCUMENTS

| | | | |
|---|---|---|---|
| 2016/0205004 A1* | 7/2016 | Chou | H04L 43/08 709/224 |
| 2016/0212016 A1* | 7/2016 | Vrzic | H04L 41/5051 |
| 2016/0212620 A1* | 7/2016 | Paczkowski | H04W 12/08 |
| 2016/0219076 A1* | 7/2016 | Paczkowski | G06F 9/45558 |
| 2016/0226663 A1* | 8/2016 | Jones | H04L 9/14 |
| 2016/0226912 A1* | 8/2016 | Clark | H04L 63/20 |
| 2016/0226913 A1* | 8/2016 | Sood | H04L 63/20 |
| 2016/0234725 A1* | 8/2016 | Paczkowski | H04W 76/02 |
| 2016/0323200 A1* | 11/2016 | Xiang | H04L 47/781 |
| 2016/0337329 A1* | 11/2016 | Sood | H04L 63/08 |
| 2016/0350150 A1* | 12/2016 | Marquardt | G06F 9/45558 |
| 2016/0352537 A1* | 12/2016 | Marquardt | H04L 12/4679 |
| 2016/0366123 A1* | 12/2016 | Smith | H04L 61/1511 |
| 2016/0373474 A1* | 12/2016 | Sood | H04L 63/1425 |
| 2016/0378685 A1* | 12/2016 | Spurlock | G06F 12/145 711/163 |
| 2017/0005990 A1* | 1/2017 | Birger | H04L 63/045 |
| 2017/0012968 A1* | 1/2017 | Feng | H04L 63/0823 |
| 2017/0012975 A1* | 1/2017 | Ilyadis | H04L 63/08 |
| 2017/0102957 A1 | 4/2017 | Marquardt et al. | |

OTHER PUBLICATIONS

Notice of Allowance dated Feb. 21, 2017, U.S. Appl. No. 14/793,344, filed Jul. 7, 2015.

Paczkowski, Lyle W., et al., "Trusted Signaling in 3GPP Interfaces in a Network Function Virtualization Wireless Communication System," filed Jan. 10, 2017, U.S. Appl. No. 15/403,166.

Notice of Allowance dated Oct. 5, 2016, U.S. Appl. No. 14/746,615, filed Jun. 22, 2015.

Notice of Allowance dated Sep. 20, 2016, U.S. Appl. No. 14/703,885, filed May 5, 2015.

Foreign Communication from a Related Counterpart—International Search Report and Written Opinion dated Oct. 21, 2016, filed on Aug. 11, 2016, International Application No. PCT/US2016/046648.

Hwang, Jinho, et al., entitled, "NetVM: High Performance and Flexible Networking Using Virtualization on Commodity Platforms," 11th USENIX Symposium on Networked Systems Design and Implementation (NSDI '14); Apr. 2-5, 2014, Seattle WA, US, ISBN 978-1-931971-09-06.

Marquardt, Ronald R., et al., "System and Method for Trusted Operability When Moving Between Network Functions Virtualization States," filed on Aug. 11, 2016, International Application No. PCT/US2016/046648.

Bales, Mark R., et al., "Session Aggregator Brokering of Data Stream Communication," filed Oct. 3, 2016, U.S. Appl. No. 15/284,506.

FAIPP Pre-Interview Communication dated Jul. 25, 2016, U.S. Appl. No. 14/703,885, filed May 5, 2015.

Network Functions Virtualisation, "An Introduction, Benefits, Enablers, Challenges & Call for Action," Oct. 22-24, 2012, "SDN an OpenFlow World Congress," Darmstadt-Germany.

Network Functions Virtualisation, "Network Operator Perspectives on Industry Progress," Oct. 14-17, 2012, "SDN an OpenFlow World Congress," Darmstadt-Germany.

Paczkowski, Lyle W., et al., "Trusted Signaling in 3GPP Interfaces in a Network Function Virtualisation Wireless Communication System," filed Jun. 22, 2015, U.S. Appl. No. 14/746,615.

Marquardt, Ronald R., et al., "System and Method of a Trusted Computing Operation Mode," filed May 5, 2015, U.S. Appl. No. 14/703,885.

Marquardt, Ronald R., et al., "Dynamic Addition of Network Function Services," filed Nov. 2, 2015, U.S. Appl. No. 14/930,146.

Marquardt, Ronald R., et al., "Support Systems Interactions with Virtual Network Functions in a Trusted Security Zone," filed Oct. 9, 2015, U.S. Appl. No. 14/879,324.

Marquardt, Ronald R., et al., "Securing Communication in a Network Function Virtualization (NFV) Core Network," filed Oct. 1, 2015, U.S. Appl. No. 14/872,936.

Marquardt, Ronald R., et al., "System and Method for Trusted Operability When Moving Between Network Functions Virtualization States," filed Oct. 9, 2015, U.S. Appl. No. 14/879,327.

Ray, Amar N., et al., "IPv6 to IPv4 Data Packet Migration in a Trusted Security Zone," filed Jul. 7, 2015, U.S. Appl. No. 14/793,344.

Notice of Allowance dated May 12, 2017, U.S. Appl. No. 15/403,166, filed Jan. 10, 2017.

Notice of Allowance dated May 26, 2017, U.S. Appl. No. 14/930,146, filed Nov. 2, 2015.

FAIPP Pre-Interview Communication dated Apr. 20, 2017, U.S. Appl. No. 14/879,324, filed Oct. 9, 2015.

Notice of Allowance dated Jul. 3, 2017, U.S. Appl. No. 14/879,324, filed Oct. 9, 2015.

Ray, Amar N., et al., "IPv6 to IPv4 Data Packet Migration in a Trusted Security Zone," filed May 22, 2017, U.S. Appl. No. 15/602,057.

* cited by examiner

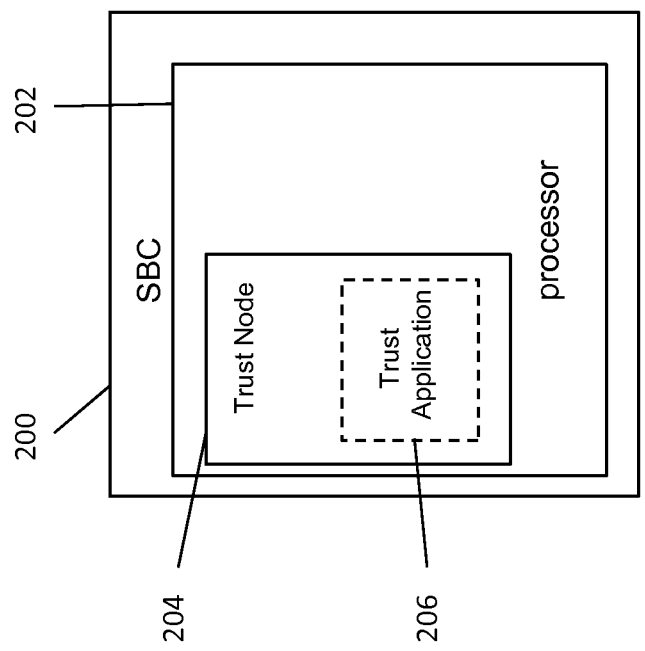

… (1)

SYSTEM AND METHOD OF ESTABLISHING TRUSTED OPERABILITY BETWEEN NETWORKS IN A NETWORK FUNCTIONS VIRTUALIZATION ENVIRONMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As proprietary hardware appliances used on network platforms have grown increasingly complex and rapidly reach the end of their life-cycle, network providers have turned to the use of a network architecture called Network Functions Virtualization ("NFV"). NFV consolidates many, if not all, network functions and virtualizes those functions as software applications, run on industry standard high volume servers, switches and storage. However, the technical challenge remains of ensuring the security of data in the NFV environment as it is transferred between multiple users, applications, servers, and/or networks with different security protocols.

SUMMARY

In an embodiment, a system for establishing a trusted end-to-end communication link between different Network Functions Virtualization ("NFV") networks is disclosed. The system comprises a first server associated with a first NFV network, wherein the first server is configured to generate and send a first trust ticket establishing the security protocol for communicating with a first NFV network. The first server is further configured to generate and send a request to engage in communication with a second server associated with a second NFV network, and to send trusted data from the first NFV network. The first server is executing in a trusted security zone, wherein the trusted security zone provides hardware assisted security. The first server is further configured to disable communication with the first NFV network after the first trust ticket, request and trusted data are sent. The system further comprises a virtual machine executing in a trusted security zone stored on a first NFV network, wherein the virtual machine executes virtualized network functions, and a session border controller executing in a trusted security zone. The session border controller comprises a trust node and an application stored on the trust node, and is configured to receive the first trust ticket, request, and trusted data from the first server; transmit the first trust ticket and request to a second session border controller, wherein the second session border controller transmits the request and first trust ticket to a second server associated with a second NFV network, executing in a trusted security zone. The session border controller is further configured to receive a response to the communication request and second trust ticket from the second server, wherein the second trust ticket establishes the security protocol for communicating with the second NFV network, also executing in a trusted security zone, and wherein the response and second trust ticket are transmitted from the second session border controller to the first session border controller; compare the first and second trust ticket for compatibility; and transmit the trusted data to the second server if the trust tickets are compatible.

In an embodiment, a system for establishing a trusted end-to-end communication link between different NFV networks is disclosed. The system comprises a first server associated with a first NFV network, wherein the first server is configured to generate and send a first trust ticket establishing the security protocol for communicating with a first NFV network, a request to engage in communication with a second server associated with a second NFV network, and trusted data from the first NFV network. The first server is executing in a trusted security zone, wherein the trusted security zone provides hardware assisted security. The first server is further configured to disable communication with the first NFV network after the first trust ticket, request and trusted data are sent. The system further comprises a virtual machine executing in a trusted security zone stored on a first NFV network, wherein the virtual machine executes virtualized network functions. The system further comprises a session border controller executing in a trusted security zone, wherein the session border controller comprises a trust node and an application stored on the trust node, and is configured to receive the first trust ticket, request, and trusted data from the first server; transmit the first trust ticket and request through an outbound session router to a second session border controller, wherein the second session border controller transmits the request and first trust ticket to a second server associated with a second NFV network; receives a response to the communication request and second trust ticket from the second server executing in a trusted security zone, wherein the second trust ticket establishes the security protocol for communicating with the second NFV network, and wherein the response and second trust ticket are transmitted from the second session border controller to the first session border controller; compare the first and second trust ticket for compatibility; transmit, in response to a determination that the first and second trust tickets are incompatible, a message to the first server refusing to transmit the trusted data.

A method of establishing a trusted end-to-end communication link between different NFV networks is disclosed. The method comprises receiving, by a first session border controller, from a first server executing in a trusted security zone and associated with a first NFV network, a first ticket of trust establishing the security protocol for communicating with the first NFV network, a request to engage in communication with a second server, the second server associated with a second NFV network and executing in a trusted security zone, and trusted data from the first NFV network. The method further comprises disabling communication between the first session border controller and the first server after the trust ticket, request and trusted data have been sent; transmitting, by the first session border controller, the first trust ticket and request to a second session border controller; and transmitting, by the second session border controller, the first trust ticket and request to the second server. The method further comprises generating, by the second server, a trust ticket establishing the security protocol for communicating with the second NFV network, and a response to the request for communication from the first server. The method further comprises transmitting, by the second server to the second session border controller, the trust ticket and response and transmitting, by the second session border controller, the second trust ticket and response to the first session border controller. The method further comprises comparing, by the first session border controller, the first and second trust tickets for compatibility and transmitting, by the first session border controller, the trusted data to the second server associated with the second NFV network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 is an illustration of a component of a system according to an embodiment of the disclosure.

DETAILED DESCRIPTION

Figure 1:
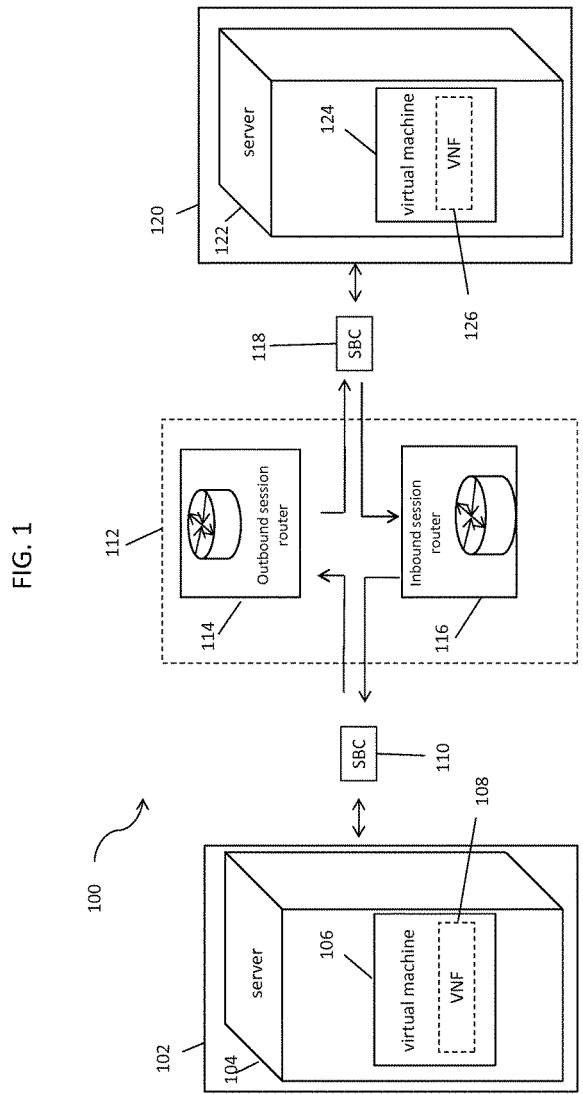
FIG. 1 is an illustration of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network providers currently use many different hardware appliances and software to run various network functions. Such hardware and software has grown increasingly complex and more rapidly reaches its end of life, and may entail higher investment and restructuring costs to the network provider. Many network providers are turning to the use of a network architecture called Network Functions Virtualization ("NFV"). NFV proposes to address these concerns by consolidating many, if not all, network functions and virtualizing those functions as software applications, run on general purpose computing hardware, such as industry standard high volume servers, switches and storage. NFV has many advantages, such as reduced equipment costs, reduced power consumption, decreased time to market for new services and applications, as well as the availability to use a single network for different applications and users. A technical challenge for NFV is ensuring the security of data as it is transferred between multiple different users, applications, servers, and/or networks with different security protocols and processes. For a more detailed discussion of NFV architecture, see the following publications:

"Network Functions Virtualization—Introductory White Paper," found at portal (dot) etsi (dot) orq (slash) nfv (slash) nfv white paper (dot) pdf; and "Network Functions Virtualization—White Paper #3," found at portal (dot) etsi (dot) org (slash) Portal (slash) 0 (slash) TBpages (slash) NFV (slash) Docs (slash) NFV White Paper 3 (dot) PDF.

At the core, an NFV platform utilizes Virtual Machines ("VM") to run the network functions as software applications, called Virtualized Network Functions ("VNF"). The security issues posed by NFV are several. One security issue is that the physical perimeter of network functions become blurred or fluid, causing increasing difficulty in defining and managing security zones. The creation and maintenance of firewalls becomes more complicated with NFV. Another issue is that the introduction of hypervisors, i.e. the software, firmware, or hardware that creates and runs VMs, can result in compromised isolation between VMs, making security more difficult to maintain. The use of hypervisors can cause performance degradation, and because different vendors may provide the hardware, hypervisors, software, and/or VNFs, the risk of security holes and vulnerability to hacking, spoofing, or other corruption may be increased.

The present disclosure teaches systems and methods of establishing trusted operability between networks operating on NFV platforms. Trusted operability means establishing trusted security zones (described herein), or a complete trusted execution zone (described herein) between networks either within the NFV platform or between networks on disparate NFV platforms. Such trusted security zones are necessary in the NFV environment where data existing in a trusted environment may need to be transferred and stored in an untrusted environment, where data may need to be transferred from one trusted environment to another across an untrusted network, or where data and processes occurring in a trusted environment may need to connect and communicate with untrusted environments, such as applications operating in a cloud environment.

A NFV network environment poses unique security challenges for trusted communications. In a core environment where the total system is trusted (say, for example, an internal network system of a wireless carrier), establishing a trusted end to end communications link means the entire communication pathway is encrypted and secure and the network nodes in the pathway are executing in trusted security zones. In an NFV network, the communication pathway between various points of the network may travel over the Internet, including passing through servers that are untrusted. Further, one NFV network that has a hardware root of trust may desire to communicate with a cloud based application located on a server that has entirely different hardware which may not contain hardware assisted security.

More particularly, although a trusted and secure communication link may be able to be established within an NFV network, for example with a hardware root of trust, the servers at the endpoints of the NFV network may not be secure and represent a vulnerability to hacking or incursion. In this disclosure, establishing a trusted end to end communication link between NFV networks that addresses the end point vulnerability is provided by the use of session border controllers functioning as Network to Network Interfaces ("NNI"). The session border controller is modified with protocols that instruct it how to establish that the endpoints of the proposed communication path are trusted prior to creating the communication link.

An NNI typically operates by establishing a contractual agreement between two networks wherein the networks define pre-authorized voice and/or data traffic, usually involving some form of authentication and authorization. The NNI specifies the signaling and management functions between networks, including how to manage traffic that will flow across in terms of size and normalizing the communication between networks. The fluidity of the NFV environment makes the use of an NNI more difficult because the parameters of authorization and authentication may be constantly changing and, for example, in a cloud computing environment, the pathway between networks may be hidden or obscured, and consequently unsecure.

In an NFV network, the network implements network functions on VMs using VNFs, located and executable across any number of servers. These servers can be physical servers, hypervisors, or any other general purpose computing equipment that can implement virtualization technology. In an embodiment, disparate servers on an NFV network, or disparate NFV networks, can exchange data in trust only if trust can be established between the disparate servers or NFV networks. In an embodiment, a trusted end-to-end communication link is established through the use of an NNI. For further details about trusted end-to-end communication links, see U.S. patent application Ser. No. 13/532,588, filed Jun. 25, 2012, entitled "End-to-End Trusted Communications Infrastructure," by Leo Michael McRoberts, et al., which is incorporated by reference herein in its entirety.

This disclosure describes, in an embodiment, how the establishment of an NNI functions alongside the hardware root of trust in an NFV environment to maintain the security of the NFV network trusted processes. Specifically, if one NFV network wishes to communicate in trust with another NFV network, the first NFV network will execute in trust, in a trusted execution zone (described in more detail below), using the hardware root of trust on a virtual machine (VM), operating on a virtual server. This means that all non-trusted processes are terminated on that VM and a hypervisor restricts access to the trusted execution zone by all other processes except the trusted process. A trust node in a trusted application, executing on a virtual server, creates an initial communication request or "invite", called a trust ticket, and sends it to a session border controller (SBC) for establishment of the NNI. Once the SBC has processed and accepted the initial communication request (as described below), the VM and the SBC terminate communication such that no untrusted or corrupted processes can infiltrate into the first NFV network.

In an embodiment, the SBCs take on the function of an NNI and establish and control the initiation, flow, and termination of the transfer of data between networks. SBCs may establish a network interface in the following manner. The SBC receives the initial request, or "invite" from network A to communicate with network B. The SBC identifies and authenticates the identity of network A and may translate information contained in the invite, such as removing identifying information about network A, or may simply forward the invite unchanged. The SBC also saves the data associated with the communication and then terminates the connection with network A. The SBC opens a connection between itself and network B, sending the invite to network B. Essentially, an air gap between network A and network B is created with the SBC acting as an intermediate in order to authorize and authenticate the communication. When the invite is received, authenticated, and accepted by network B, the SBC transmits the data to network B. This process is sometimes referred to as establishing a pinhole, meaning that a single port is used for a single transaction between networks and then the transaction is terminated and the port is closed.

In order to establish a trusted end-to-end communication link between disparate networks, SBCs control the gateway between networks by creating or utilizing a ticket of trust for the pinhole prior to opening the pinhole to transmit or receive data. The process of creating this trust handshake means that the SBCs have knowledge of both the initiating network's and the receiving network's security and operating procedures. In an embodiment, the SBC accomplishes this by having one or more dedicated trusted processors, in other words a processor dedicated to operating in a trusted environment or node, and trusted applications dedicated to running the trusted processes and creating the ticket of trust.

More specifically, to create a trusted environment for the exchange of data, the session border controllers and associated network servers operate as follows. A trusted application operating on a server of network A will send a request to communicate to network B to a trusted node of an SBC. The server will generate a trust ticket establishing the security protocol to use between network A and B, send that to a trusted node of the SBC, and then a switching application will close the network interface between network A and the SBC. The trusted node of the SBC will transmit, through an outbound session router, the request and trust ticket to a server operating on network B. The outbound session router for the SBC is separated from an inbound session router such that the pathway for transmission of data across each router is separate and independent. The network B server will generate a trust ticket for network B and transmit it, by an inbound session router, to the trusted node of the SBC, which sends that trust ticket to the server of network A. As long as the trust tickets for networks A and B match, then a trusted security zone is established for the pinhole and the pinhole is opened for the transmission of the trusted data. The communication link is now trusted from end to end because networks A and B execute in trusted execution zones on their respective virtual servers and through the trusted NNI pinhole to exchange trusted data.

In the situation where the trust tickets are incompatible, the SBC does not send the trusted data to network B. The SBC sends a message to the server associated with network A informing it that a trusted security zone could not be established because the trust tickets are incompatible. The server associated with network A will then terminate the request for communication. If the trust tickets do not match, then the receiving NFV network, in other words network B, is assumed by the sending NFV network, network A, to be an imposter or a potential security risk and network A will deny access.

Establishing a trusted environment for the exchange of data, in the manner described above, can be useful in an NVF environment where it may be necessary to transfer data between a compute network and a data network. A compute network is generally any processor or network that carries out processing functions and works with executable applications. A data network, on the other hand, is any storage environment where data is stored and from which it can be retrieved. In some situations, a compute network may contain some or all of its operations in a trusted environment and may need to store the output of its processes on a data network, which may not exist in a trusted environment. In other situations, both the compute network and the data network may operate or exist in trusted environments, but in order to communicate, the compute network and data network may need to cross an untrusted network. A further example may be where the data network exists in an untrusted part of hardware that also contains the trusted compute network, and a trusted end-to-end communication link is established in order to store trusted data in the data network. In another embodiment, establishing a trusted environment can be useful to facilitate communication between two disparate networks operating on different NFV platforms that may have different security protocols.

A trusted security zone provides processors on a server with a hardware root of trust, a secure execution environment for applications, and secure access to peripherals. The server architecture is designed to promote a programmable environment that allows the confidentiality and integrity of assets to be protected from specific attacks. Trusted security zone capabilities are becoming features in both wireless and fixed hardware architecture designs. Providing the trusted security zone in the server and protecting the hardware root of trust removes the need for separate secure hardware to authenticate the server. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main server operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A server that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the server into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main server operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the server processor architecture at the time of manufacture through hardware logic present in the trusted security zone which enables a perimeter boundary between the secure partition and the normal partition. The trusted security zone may only be manipulated by those with the proper credential and, in an embodiment, may not be added to the server after it is manufactured. Software architecture to support the secure partition may be provided through a dedicated secure kernel running trusted applications. Trusted applications are independent secure applications which can be accessed by normal applications through an application programming interface in the trusted execution environment on a server that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the server users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the server. The security of the system is achieved at least in part by partitioning the hardware and software resources of the server so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the server which may execute in the normal partition operating system described above. The trusted security zone runs a separate operating system for the secure partition that is installed by the mobile device manufacturer or vendor, and users are not able to install new applications in or alter the contents of the trusted security zone.

FIG. 1 is an illustration of a system 100 according to embodiments of the present disclosure. In the system 100, trust is sought to be established between a first NFV network 102 and a second NFV network 120 by using NNI 112. A first NFV network 102 may comprise at least one server 104, which can be any generalized purpose hardware, a hypervisor, combination of hardware and a hypervisor, or other equipment that can execute a virtual machine 106. The first NFV network 102 further comprises one or more virtual machines 106 that operate on server 104. The virtual machine 106 may run one or more virtualized network functions 108.

In network function virtualization, network functions may be factored into a plurality of common functions. Some of these common functions may be used by two or more network functions, for example a network attach common function may be used by both a mobility management entity (MME) network function and by a home subscriber server (HSS) network function. The factored and/or common functions may each execute in virtual servers. A management application or network function state control application orchestrates the delivery of the conventional network function by sending processing requests with parameters sequentially to the common functions. The management applications or network function state control applications may also execute in virtual servers. For further details about network function virtualization, see U.S. patent application Ser. No. 14/746,615, filed Jun. 23, 2015 entitled "Trusted Signaling in 3GPP Interfaces in a Network Function Virtualization Communication System," by Lyle W. Paczkowski, et al., which is incorporated by reference herein in its entirety.

In an embodiment, the first NFV network 102 provides core network services to a radio access network (RAN) that provides communication service to user equipments (UEs), where the RAN supports at least one of a long term evolution (LTE), a code division multiple access (CDMA), a global system for mobile communication (GSM), and a worldwide interoperability for microwave access (WiMAX) wireless communication protocol. The UEs may comprise smart phones, media players, laptop computers, tablet computers, notebook computers, wearable computers, headset computers, and the like. RAN may comprise enhanced node B (eNBs) or base transceiver stations (BTSs) (e.g., 'cell towers') that provide wireless communication links to the UEs and wired links to the first NFV network 102. In some circumstances, the RAN and UEs may be considered to be trusted because the RAN is un-hackable and secure.

Continuing with FIG. 1, a second NFV network 120 may comprise at least one server 122, which can be any generalized purpose hardware, a hypervisor, combination of hardware and a hypervisor, or other equipment that can execute the virtual machine 124. The second NVF network further comprises one or more virtual machines 124 that operate on server 122. The virtual machine 124 may run one or more virtualized network functions 126. System 100 further comprises one or more SBCs 110 and 118 which function, in addition to session routers 114 and 116, to create NNI 112 for trusted communication between the first NFV network 102 and the second NFV network 120. In an alternative embodiment, the system 100 may comprise one NFV network and one non-NFV network. For example, the second network 120 may be a conventional communication network (i.e., a network that does not rely upon network function virtualization with factored common functions executing in virtual servers).

FIG. 2 is an illustration according to an embodiment of SBC 200. The SBC 200 can be an SBC operating on an NFV network, such as SBCs 110 and 118, or can be any SBC operating within a network that operates to establish a trusted end-to-end communication link for the transmission of data. The SBC 200 may comprise a processor 202 with untrusted and trusted processes, or alternatively, may exclusively contain trusted processes. Trusted processes in SBC 200 exist within a dedicated processor on SBC, trust node 204. A trusted application 206 carries out the functions of trust node 204.

In an embodiment, for example, a trusted application (not shown) operating on server 104 of the first NFV network 102 sends a request to communicate with the second NFV network 120 to trust application 206 located on trust node 204 of SBC 110. Server 104 generates a trust ticket (not shown) and sends the trust ticket to trust application 206 on trust node 204. Server 104 then deactivates the network interface between the first NFV network 102 and SBC 110. Trust application 206 on trust node 204 transmits the communication request and trust ticket through outbound session router 114 to a trust application 206 on trust node 204 of SBC 118. Trust application 206 on trust node 204 of SBC 118 forwards the request and trust ticket to server 122, operating on a second NFV network 120 for authorization. Server 122 generates a response to the request (not shown) and a second trust ticket for second NFV network 120 and transmits it to trust application 206 on trust node 204 on SBC 118. The SBC 118 sends the response and trust ticket through inbound session router 116 to trust application 206 on trust node 204 of SBC 110. If the trust tickets match, a trusted end-to-end communication link is established and trust node 204 on SBC 110 then transmits the trusted data. Once the trusted data is transmitted, server 122 deactivates the interface between the second NFV network 120 and SBC 118, thus closing the pinhole.

In a further embodiment, the trust application 206 evaluates whether the trust tickets are compatible. In the situation where the trust tickets are incompatible, a trusted end-to-end communication link is not established, and trust node 204 on SBC 110 refuses to transmit the trusted data. Trust application 206 then generates a message to server 104 indicating that the trust tickets are not compatible and that trusted data was not transmitted. Server 104 will then instruct SBC 110 to terminate its connection with SBC 118.

Figure 3A:
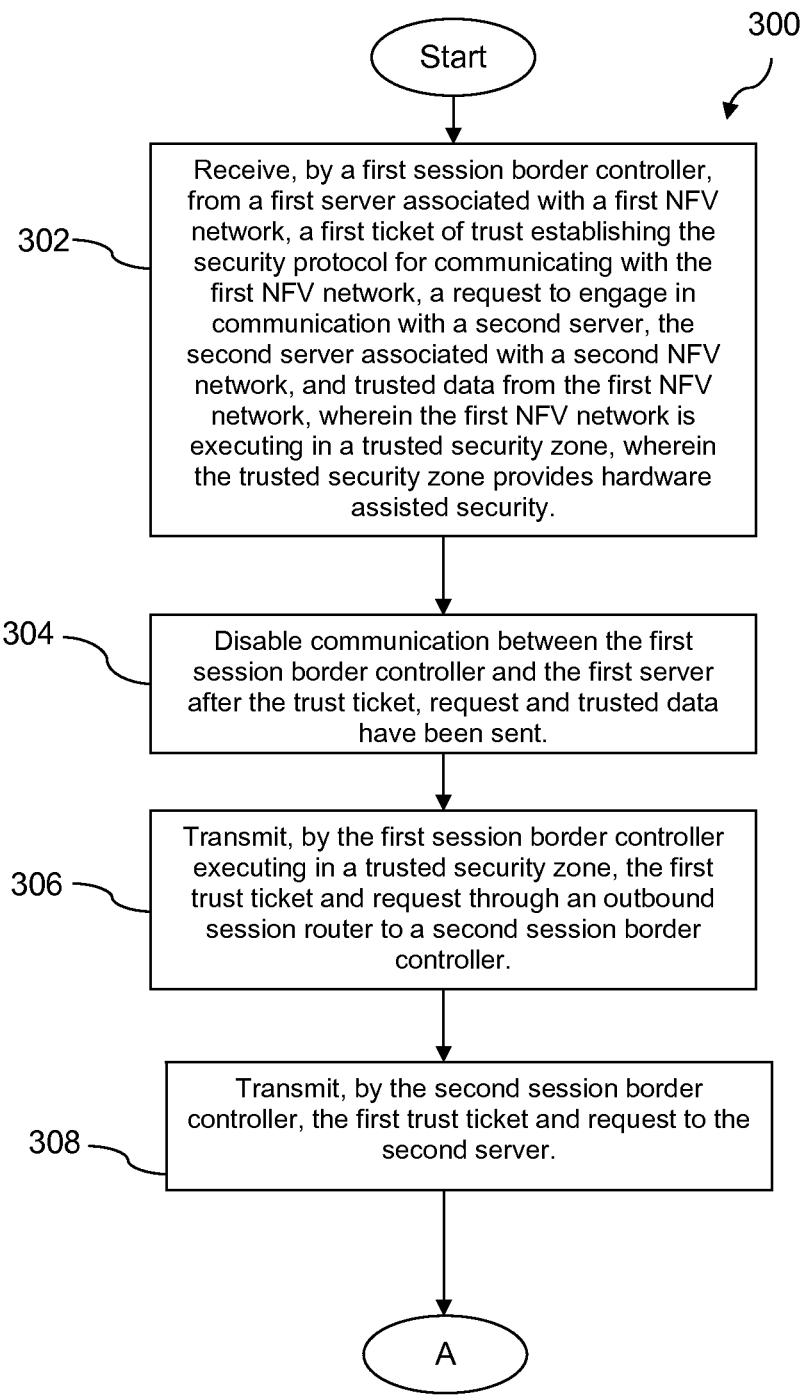
FIG. 3A and FIG. 3B is a flow chart illustrating a method in accordance with an embodiment of the disclosure.
Figure 3B:
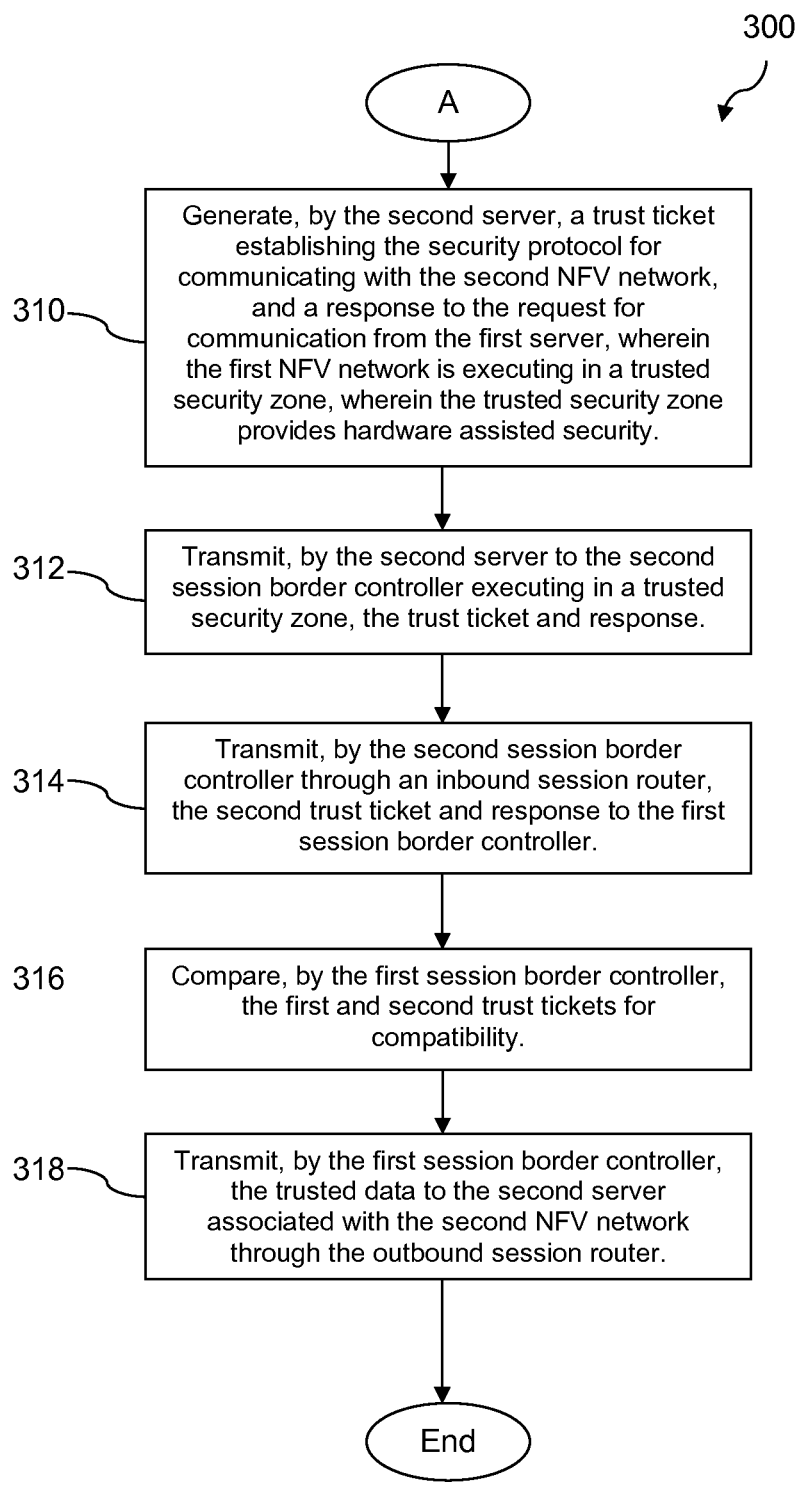

FIG. 3A and FIG. 3B is an illustration of method 300 in accordance with an embodiment. At block 302, SBC 110 receives a request to communicate with second NFV network 120, a trust ticket, and trusted data from server 104 associated with first NFV network 102. At block 304, server 104 then deactivates the communication between first NFV network 102 and SBC 110. At block 306, SBC 110 transmits the communication request and trust ticket through outbound session router 114 to SBC 118. At block 308, SBC 118 forwards the request and trust ticket to server 122 associated with second NFV network 120. At block 310, server 122 generates a response to the request and a second trust ticket for second NFV network 120. At block 312, server 122 transmits the response and second trust ticket to SBC 118. At block 314, SBC 118 sends the response and trust ticket through inbound session router 116 to SBC 110. At block 316, SBC 118 compares the trust tickets for compatibility. At block 318, SBC 110 transmits the trusted data to second NFV network 120 if the trust tickets are compatible.

Figure 4:
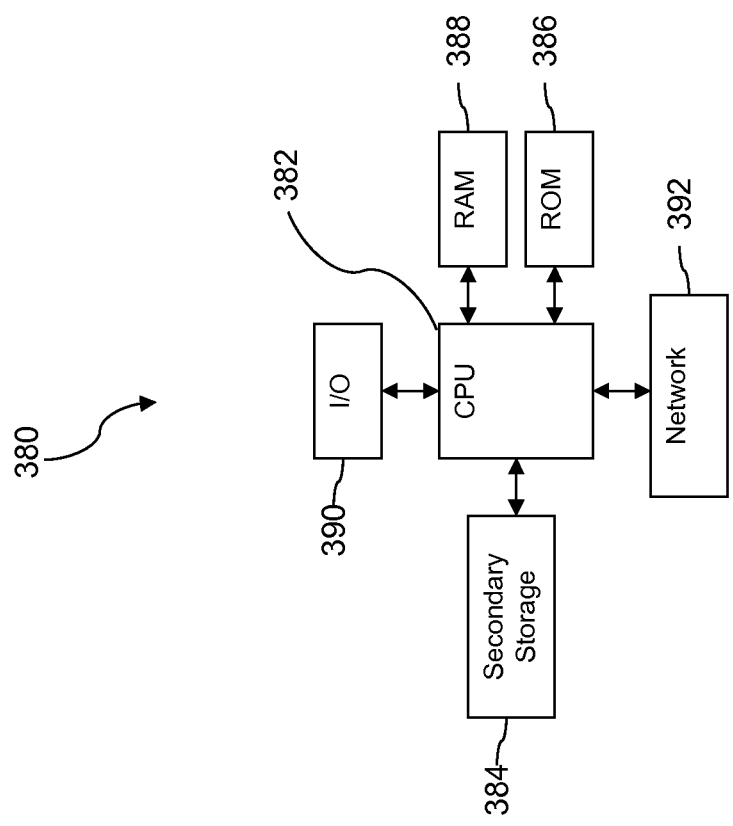
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for establishing a trusted end-to-end communication link between different Network Function Virtualization (NFV) networks, comprising:
   a first server associated with a first NFV network, wherein the first server comprises a processor coupled to memory and is configured to:
   generate and send a first trust ticket establishing the security protocol for communicating with the first NFV network, a request to engage in communication with a second server associated with a second NFV network, and trusted data from the first NFV network, wherein the first NFV network is executing in a trusted security zone that provides hardware assisted security, and wherein the second server comprises a processor coupled to memory; and
   disable communication with the first NFV network after the first trust ticket, request and trusted data are sent;
   a virtual machine stored on the first NFV network, wherein the virtual machine executes virtualized network functions and is executing in a trusted security zone; and
   a session border controller executing in a trusted security zone, wherein the session border controller comprises a trust node and an application stored on the trust node, configured to:

receive the first trust ticket, request, and trusted data from the first server;

transmit the first trust ticket and request to a second session border controller, wherein the second session border controller transmits the request and first trust ticket to the second server associated with the second NFV network;

receive a response to the request and a second trust ticket from the second server, wherein the second trust ticket establishes the security protocol for communicating with the second NFV network, wherein the response and second trust ticket are transmitted from the second session border controller to the first session border controller, and wherein the second NFV network is executing in in a trusted security zone, that provides hardware assisted security;

compare the first and second trust tickets for compatibility; and transmit the trusted data to the second server if the trust tickets are compatible.

2. The system of claim 1, wherein the first NFV network and the second NFV network comprise one of the following group: a compute network, a data network, a server, or other computer system in communication with a network operating in an NFV environment.

3. The system of claim 1, wherein the first session border controller, executing in a trusted security zone, transmits data to the second NFV network by way of an outbound session router.

4. The system of claim 3, wherein the second session border controller, executing in a trusted security zone, transmits data to the first NFV network by way of an inbound session router.

5. The system of claim 4, wherein the outbound session router and inbound session router transmit data on independent pathways.

6. The system of claim 1, wherein the first and second session border controller are located on the same device.

7. The system of claim 1, wherein the second server is configured to disable communication between the second session border controller and the second server after the transmission of the trusted data is complete.

8. A system for establishing a trusted end-to-end communication link between different Network Function Virtualization (NFV) networks, comprising:

a first server associated with a first NFV network, wherein the first server comprises a processor coupled to memory and is configured to:

generate and send a first trust ticket establishing the security protocol for communicating with the first NFV network, a request to engage in communication with a second server associated with a second NFV network, and trusted data from the first NFV network, wherein the first NFV network is executing in a trusted security zone that provides hardware assisted security, and wherein the second server comprises a processor coupled to memory; and disable communication with the first NFV network after the first trust ticket, request and trusted data are sent;

a virtual machine stored on the first NFV network, wherein the virtual machine executes virtualized network functions and is executing in a trusted security zone; and a session border controller executing in a trusted security zone, wherein the session border controller comprises a trust node and an application stored on the trust node, configured to:

receive the first trust ticket, request, and trusted data from the first server;

transmit the first trust ticket and request to a second session border controller, wherein the second session border controller transmits the request and first trust ticket to the second server associated with the second NFV network;

receive a response to the request and a second trust ticket from the second server, wherein the second trust ticket establishes the security protocol for communicating with the second NFV network, wherein the response and second trust ticket are transmitted from the second session border controller to the first session border controller, and wherein the second NFV network is executing in a trusted security zone that provides hardware assisted security;

compare the first and second trust tickets for compatibility; and transmit, in response to a determination that the first and second trust tickets are incompatible, a message to the first server refusing to transmit the trusted data.

9. The system of claim 8, wherein the first NFV network and the second NFV network comprise one of the following group: a compute network, a data network, a server, or other computer system in communication with a network operating in an NFV environment.

10. The system of claim 8, wherein the first session border controller, executing in a trusted security zone, transmits data to the second NFV network by way of an outbound session router.

11. The system of claim 10, wherein the second session border controller, executing in a trusted security zone, transmits data to the first NFV network by way of an inbound session router.

12. The system of claim 11, wherein the outbound session router and inbound session router transmit data on independent pathways.

13. The system of claim 8, wherein the first and second session border controller are located on the same device.

14. The system of claim 8, wherein the first session border controller is configured to disable communication with the second session border controller and the second server after refusing transmission of the trusted data.

15. The system of claim 8, wherein the first NFV network provides core network services to a radio access network (RAN) that provides communication service to user equipment (UE), where the RAN supports at least one of an orthogonal frequency division multiple access, a code division multiple access (CDMA), a global system for mobile communication, and a worldwide interoperability for microwave access wireless communication protocol.

16. A method of establishing a trusted end-to-end communication link between different Network Function Virtualization (NFV) networks, comprising:

receiving, by a first session border controller, from a first server associated with a first NFV network, a first ticket of trust establishing the security protocol for communicating with the first NFV network, a request to engage in communication with a second server, the second server associated with a second NFV network, and trusted data from the first NFV network, wherein the first NFV network is executing in a trusted security zone that provides hardware assisted security;

disabling communication between the first session border controller and the first server after the first trust ticket, request, and trusted data have been sent;

transmitting, by the first session border controller executing in a trusted security zone, the first trust ticket and request through an outbound session router to a second session border controller;

transmitting, by the second session border controller executing in a trusted security zone, the first trust ticket and request to the second server;

generating, by the second server, a second trust ticket establishing the security protocol for communicating with the second NFV network, and a response to the request for communication from the first server, wherein the second NFV network is executing in a trusted security zone that provides hardware assisted security;

transmitting, by the second server to the second session border controller executing in a trusted security zone, the second trust ticket and response;

transmitting, by the second session border controller through an inbound session router, the second trust ticket and response to the first session border controller;

comparing, by the first session border controller, the first and second trust tickets for compatibility; and transmitting, by the first session border controller executing in a trusted security zone, the trusted data to the second server associated with the second NFV network through the outbound session router.

17. The method of claim 16, wherein the second server disables communication between the second session border controller and the second server after transmission of the trusted data is complete.

18. The method of claim 16, wherein the first session border controller is configured to send a message to the first server that the first and second trust tickets are incompatible.

19. The method of claim 16, wherein the first session border controller refuses to transmit the trusted data where the first and second trust tickets are incompatible.

20. The method of claim 19, wherein the first session border controller is further configured to send a message to the first server that no trusted data was transmitted.

* * * * *